United States Patent [19]

Williams

[11] 4,163,070
[45] Jul. 31, 1979

[54] SHROUDING SKINNED MEAT CARCASSES

[75] Inventor: Beverly E. Williams, P.O. Box 299, San Mateo, Calif. 94401

[73] Assignees: B. E. Williams; K. I. Williams, both of San Mateo, Calif.

[21] Appl. No.: 793,744

[22] Filed: May 4, 1977

[51] Int. Cl.² ............................................. A23B 4/00
[52] U.S. Cl. ................................. 426/642; 17/49; 426/415; 426/418; 426/524
[58] Field of Search ............... 426/125, 129, 132, 135, 426/642, 652, 410, 415, 418, 524; 57/140 BY; 138/118.1, 123; 139/426 R, 383 R; 17/15, 49

[56] References Cited
U.S. PATENT DOCUMENTS 3,124,468  3/1964  Williams .............................. 426/323

*Primary Examiner*—Arthur L. Corbin
*Attorney, Agent, or Firm*—Dorfman, Herrell and Skillman

[57] ABSTRACT

A freshly slaughtered and skinned meat carcass has its skinned surface covered with a shroud consisting of a rectangular cloth composed of a blend of cotton and polyester fibers and held in place by skewers to cause the shroud to fit tightly against the skinned surface. The shroud is saturated with an aqueous saline solution when applied, and the fully wetted shroud is allowed to lose its moisture in the chilling room as the carcass loses its body heat.

3 Claims, No Drawings

SHROUDING SKINNED MEAT CARCASSES

The present invention relates to shrouding freshly slaughtered meat carcasses.

Prior to the present invention, the packing industry has used highly absorbent shrouds for application to freshly skinned carcasses during the chilling process in order to reduce damage to the carcass, smooth the fat surface, increase the whiteness of the outer fat surface and to reduce moisture loss and minimize loss in carcass weight during the chilling process. Care was exercised to remove the shroud prior to its being fully dried in order to eliminate the possibility of the shroud damaging the smooth and bleached surface of the fat, for example by causing separation of small pieces of the fell or fat.

Cotton has been widely used as a shroud material because of its high absorbency, ready availability in the United States, and the low cost per shroud which minimizes the disadvantage of a short shroud life. It is necessary to discontinue using shrouds when the shroud becomes torn or weakened to a point where it is unable to withstand the tension applied to the shroud during the process of stretching and skewering the shroud over the carcass, or when the shroud becomes excessively stained with blood or other extraneous material.

Another popular shroud is the shroud composed of ramie fiber which has strength and absorbency superior to cotton, particularly when wet, and which exhibits remarkable resistance to staining and deterioration from microorganisms. The primary disadvantage of ramie shrouds is the fact that the ramie fiber is not native to the United States and has properties which require special techniques both in the decortication and degumming of the fiber, the spinning of the fiber into thread and the fabrication into shroud cloth. The cost of producing ramie shrouds is therefore higher than that of cotton shrouds and high quality shrouds of ramie construction have not always been consistently available from the Orient or Brazil.

Attempts to find substitute material, particularly a synthetic material, which is satisfactory for the commercial production of beef shrouds has been a continuing effort with poor results.

The patent literature shows many attempts to provide a satisfactory substitute for the cotton or ramie shroud, but such attempts have not been productive of a shroud material which is capable of withstanding the unique conditions to which a shroud cloth is subjected and, at the same time, which may be produced at a cost or with consistency comparable to the cost of a cotton or ramie shroud. The history of the shroud market is a series of noble experiments, all of which have led back to the use of fabric composed of either cotton or ramie fibers. These natural cellulosic fibers have not been satisfactorily replaced on a commercial scale.

The previous attempts to provide a substitute material for shrouding have proved that the results which are anticipated are not always achieved, and that the shrouding operation has problems inherent in it which do not admit of standard solutions. Not only is the shrouding operation done manually, thereby subjecting the shrouds to a wide variety of manipulation which is not uniform or consistent, but the carcasses to which the shroud is applied are individually-grown carcasses which are, by their very own nature, unique in both size and shape. The procedure for handling shrouds may vary from one packing house to another and the conditions under which the shrouds are stored and used likewise are widely varied from plant to plant. These variables control the life span of a shroud in a particular plant, and the unsatisfactory experiences with attempted improvements in the shrouds tend to discourage developments which depart from the standard cotton or ramie shroud cloth.

The present invention provides an acceptable substitute which prolongs the life of the shroud, improves the fit of the shroud on the carcass or side and yet preserves the desirable characteristics provided by the conventional cotton or ramie shroud.

In particular, the present invention provides a shroud which may be used in the conventional manner by saturating the shroud with an aqueous saline solution, for example by soaking the shroud in a reservoir of the solution. The thoroughly wetted shroud, when withdrawn from the hot (118° F.) solution, when made in accordance with the present invention, separates and unfolds into an open width which may be thereupon applied to the warm, flaccid skinned surface of each side of the carcass and anchored in place by skewers which penetrate the shroud around its periphery so as to stretch and tension the shroud against the skinned surface. With the shroud in place, the carcass is permitted to remain in the chilling room, for example through an overnight period, until the carcass assumes the temperature of the chilling room, losing the body heat remaining after slaughtering of the carcass. In this period, the shroud loses its free surface moisture and becomes at least partially dried. Following the chilling period, the shroud may be stripped from the carcass by removing the skewers and peeling the partially dried shroud from the carcass after which the shroud may be laundered to remove the blood stains and fat and then placed in a suitable container of aqueous saline solution so as to be thoroughly impregnated with the saline solution.

Specifically, the shroud of the present invention, in an embodiment which has proved thoroughly satisfactory, comprises a blend of cotton and polyester fibers. In a preferred embodiment, the cotton fiber is cotton which has a stable length of approximately $\frac{3}{4}$ to $1\frac{1}{2}$ inches and is thoroughly blended prior to spinning with polyester fibers which are cut to a $\frac{3}{4}$ to $1\frac{1}{2}$ inch staple length corresponding approximately to the cotton staple length. The blended yarns are plain woven. Preferably, the polyester fibers are semibright with a denier of 1.5. The blended fibers are jute spun with a twist of 9.01 turns per inch and provide a yarn count of 7.00/1 in both the warp and the fill. The shroud has a yarn density below 36 yarns per inch in both the warp and the fill, for example between 24 and 36 yarns per inch. Preferably, the warp has a yarn count of 30 yarns per inch and the fill has a yarn count of 28 yarns per inch. When thoroughly wetted, the yarns absorb the wetting solution, and the interstices between the yarns retain the solution by capillary attraction and ventilate the carcass surface.

It has been found that yarns having a blend of substantially equal parts by weight of cotton and polyester produce a shroud which appears to fit more snugly and firmly on the carcass than does the conventional cotton or ramie shroud. When the cotton/polyester shroud is applied to the carcass, it appears to possess a degree of elasticity which allows the shroud material to "give", avoiding fractures and tears when the shroud is skewered onto the carcass. The cloth is applied with skewers to tension the shroud on the carcass to insure that the interstices remain open to retain the solution entrained when the fabric is wet. The yieldable nature of the fabric produced by the cotton/polyester yarns also generates a tendency to cause the fabric to shrink back to its original dimensions, thereby producing a snug and firm fit while drying on the carcass. This unexpected characteristic of the fabric is believed to be derived from the fact that the fibers making up the individual yarns are composed of approximately 50% by weight of polyester and 50% by weight of cotton and are thoroughly blended prior to spinning to provide intimate blending of the cotton/polyester fibers throughout the length of the yarns. Thus, a given length of yarn from the fabric will exhibit equal content of polyester fiber and cotton fiber.

The combination of the cotton/polyester warp and fill produces a shroud which has no noticeable tendency to pill or lint and yet which exhibits the absorbency and other desirable characteristics which are expected in a shroud woven entirely of cotton or ramie. The shroud of the present invention provides results including improved appearance of the beef fat surface, higher government grading on the average, less carcass beef shrinkage, easier application and removal of the shroud, and a strong long-wearing shroud resistant to brine, bacteria, mildew, stain, caustic soaps and detergents.

The weave construction of the shroud of the present invention is comparable to the plain weave construction disclosed in my earlier U.S. Pat. No. 3,539,435 issued Nov. 10, 1970, the drawing of which is incorporated herein by reference. In the body of the shrouds, the warp density is 30 yarns per inch, whereas in the three-inch selvage the density is 60 warp yarns per inch. The weight of the fabric is in the range of 6.5 to 7.5 ounces per square yard and in the preferred embodiment, approximately 7.16 ounces per square yard.

The shroud is applied to the carcass or side in the same manner as the shroud illustrated in my earlier U.S. Pat. No. 3,155,123, issued Nov. 3, 1964, the drawing of which patent is also incorporated herein by reference.

The shroud is preferably rectangular in shape and has a width of generally 40 or 46 inches and any length generally 90 inches to approximately 120 inches. These dimensions may be varied in accordance with the requirements of a particular packing plant to accommodate different sizes and weights of carcasses or sides.

I claim:

1. A method of treating freshly slaughtered and skinned meat carcasses to smooth the fat surface, increase the whiteness of the outer fat surface and reduce carcass weight shrinkage comprising the steps of applying to each carcass a shroud consisting of a rectangular cloth consisting essentially of yarns, said cloth being thoroughly wetted with an aqueous saline solution, the yarns in said cloth consisting of a blend of cotton and polyester fibers, the density of the yarns in the cloth being less than 36 per inch in the longitudinal direction and less than 36 per inch in the transverse direction to provide interstices for capillary attraction and ventilation of the carcass surface and the accommodation of skewers without substantial fracturing of the yarns, said interstices retaining said aqueous solution when the shroud is wetted, said cloth being applied with skewers to tension the shroud on the carcass to insure that the interstices remain open to retain the solution entrained when the fabric is wet; maintaining said shrouded carcass in a cooling room to thereby cool the shrouded carcass to the cooling room temperature over a period of time sufficient to cause the shroud to lose the free surface moisture thereof and thereafter peeling the shroud from the carcass.

2. A method according to claim 1 wherein the shroud is applied to each carcass by stretching the shroud over the carcass and skewering the shroud in place and then allowing said shroud to recover to provide a snug firm fit of the shroud on the carcass as it is cooled.

3. A method according to claim 1 wherein the density of the yarns in each of the longitudinal and transverse directions is in the range between 24 and less than 36 yarns per inch.

* * * * *